United States Patent

[11] 3,625,294

| [72] | Inventor | James Morkoski |
| | | Clarendon Hills, Ill. |
| [21] | Appl. No. | 66,948 |
| [22] | Filed | Aug. 26, 1970 |
| [45] | Patented | Dec. 7, 1971 |
| [73] | Assignee | International Harvester Company |
| | | Chicago, Ill. |

[54] STEERABLE REAR WHEEL FOR PLOW
9 Claims, 3 Drawing Figs.
[52] U.S. Cl. .................................................. 172/282, 172/284
[51] Int. Cl. ...................................................... A01b 69/08
[50] Field of Search ............................................ 172/278, 291, 282–285

[56] References Cited
UNITED STATES PATENTS

| 1,843,977 | 2/1932 | Hansmann et al. | 172/284 |
| 2,206,947 | 7/1940 | Ego | 172/284 |
| 3,503,453 | 3/1970 | Johannsen et al. | 172/285 |

*Primary Examiner*—Robert E. Bagwill
*Assistant Examiner*—C. W. Hanor
*Attorney*—Floyd B. Harman ABSTRACT: A combination gauge and transport wheel is mounted on the rear end of a plow and is carried at the end of an arm pivotally connected to the plow frame for vertical movement between operating and transport positions of the plow, the rear wheel being steered by linkage operatively connecting the wheel to the tractor hitch so that turning motion of the tractor is transmitted to the wheel without impairing its gauging function.

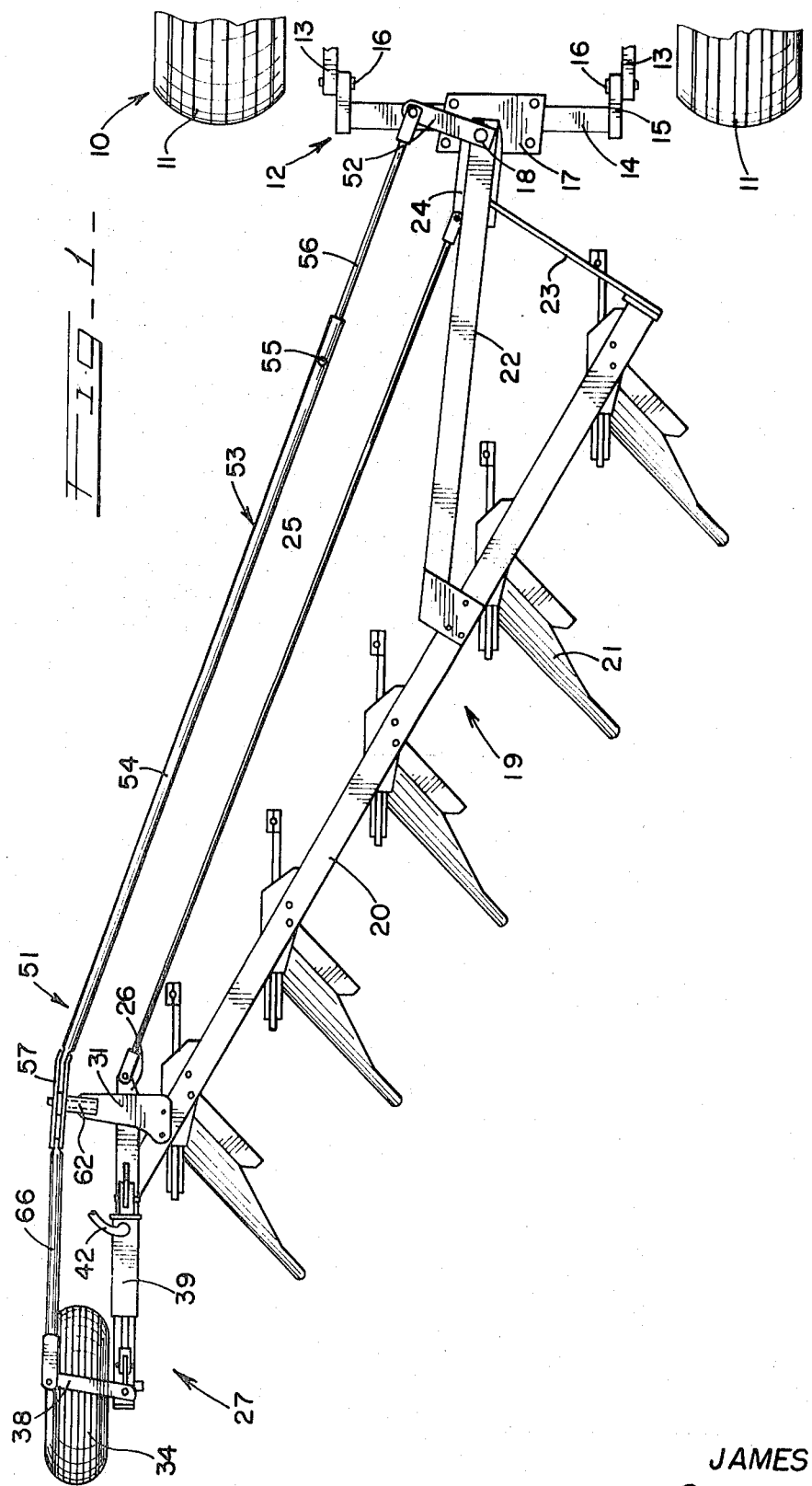

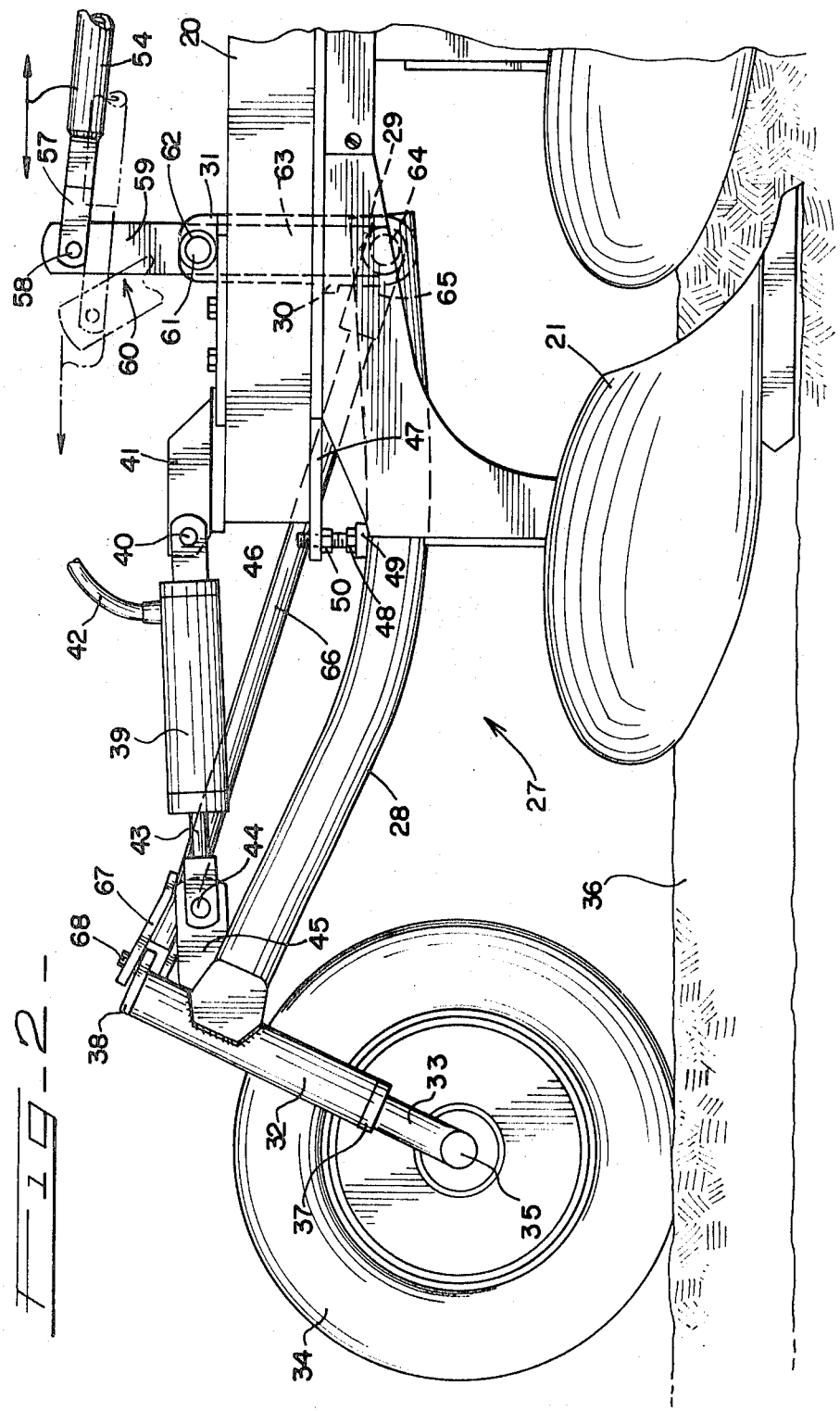

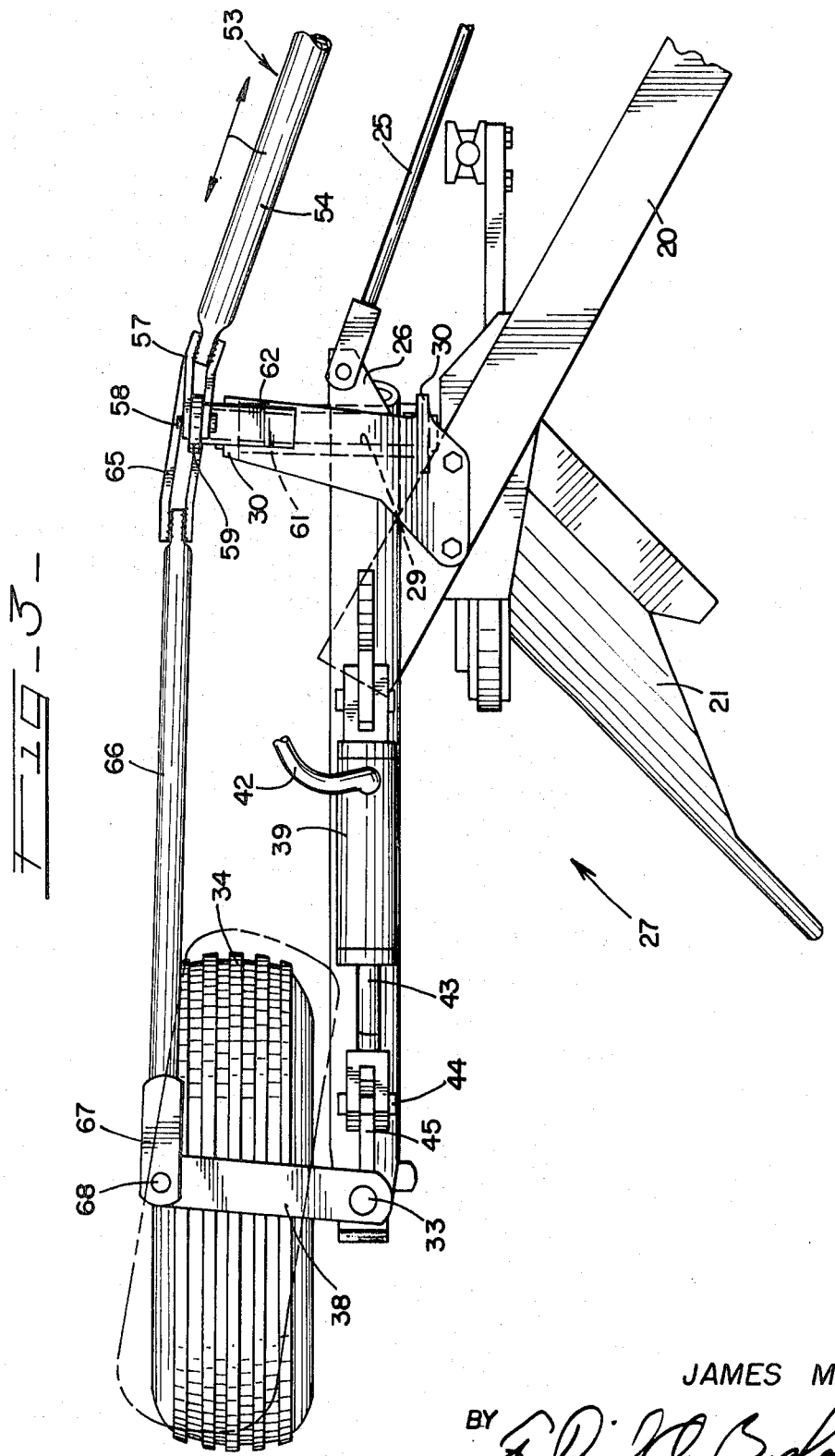

STEERABLE REAR WHEEL FOR PLOW

BACKGROUND OF THE INVENTION

The rear end of a tractor propelled multibottom plow is traditionally supported by a gauge wheel traveling on unplowed ground and by a tail wheel adapted to ride in the furrow. In transporting such a plow, in order for it to trail satisfactorily behind the tractor it is necessary to steer the furrow wheel, and turning motion of the tractor is transmitted thereto by linkage connecting the wheel to the tractor hitch. Such steering connections as have been provided have not maintained true directionality of the furrow wheel as the plow is raised or lowered. Inasmuch as the depth gauging function is performed by the gauge wheel riding on unplowed ground, the furrow wheel is allowed to float, and undesirable steering motion has been transmitted to the furrow wheel by the up and down movement thereof.

Dual furrow and gauge wheel installations add substantially to the weight and cost of the plow and it has been proposed to eliminate the gauge wheel and utilize the furrow wheel as a combination gauge and transport wheel. However, a serious disadvantage of such an installation resides in the fact that the furrow wheel, acting as a gauge wheel, rides over clods which fall back into the plowed furrow, causing the rear end of the plow to rise and resulting in undesirable fluctuations in operating depth of the plow bottoms.

It has been found that, in a modern multibottom semimounted plow using a rubber tire furrow wheel, the latter failed to carry the side draft of the plows and occasionally forced the implement to ride out of the ground due to the tire crowding against the furrow wall causing it to give way and allowing the tire to ride up on unplowed ground.

The present invention avoids the disadvantages of previous constructions and has for its object the provision of a simple and economical combination gauge and transport wheel for the rear end of a plow wherein the wheel is supported by an arm mounted by a single pivot on the plow frame, and wherein steering mechanism is provided for transmitting to the wheel the turning motion of the tractor without impairing the gauging function of the wheel.

Another object of the invention is the provision, in a multibottom plow of the semimounted type, of a combination gauge and transport wheel for the rear end of the plow wherein the wheel is arranged to travel on unplowed ground and maintains a uniform operating depth for the plow bottoms.

A further object of the invention is the provision, for the rear end of a tractor propelled plow, of a steerable combination gauge and transport wheel assembly including a wheel carrying arm mounted on the plow frame for vertical swinging movement and steering linkage connecting the tractor hitch to the wheel accommodating said vertical movement of the wheel arm substantially without the transmission of a steering motion of the wheel.

DESCRIPTION OF THE DRAWINGS

FIG. 1 is a plan view of a semimounted plow attached to the rear of a tractor and having a rear wheel mounting and steering assembly incorporating the features of this invention, with the plow shown in an elevated position;

FIG. 2 is an enlarged view in side elevation of the rear end of the plow of FIG. 1, showing the relationship of parts when the plow is in its operating position; and FIG. 3 is a plan view of the structure shown in FIG. 2 with the parts substantially in the position of FIG. 1.

DESCRIPTION OF THE PREFERRED EMBODIMENT

The numeral 10 designates a tractor having laterally spaced rear drive wheels 11 and a hitch structure 12 of the two-point type including laterally spaced hitch links 13. It may be understood that the forward ends of the hitch links 13 are connected to the tractor by means, not shown, accommodating vertical movement of the links and that the tractor is of a conventional type having a source of fluid under pressure including a reservoir and suitable valve control means, and hydraulic lift means, also not shown, for raising and lowering the hitch links in a manner well known in the art.

Forming part of the hitch structure 12 is a transverse drawbar 14 having lugs 15 at its ends connected by pins 16 to hitch links 13, and having secured to its midportion a pair of vertically spaced plates, only one of which is shown, to which is affixed the lower end of a hitch pin 18.

The implement illustrated in the drawings is a moldboard plow of the semimounted type having a supporting frame 19 comprising a diagonal beam 20 upon which is mounted a plurality of plow bottoms 21 adapted to form a furrow. Also forming part of the frame is a hitch beam 22 having its rear and secured to beam 20 and connected to the forward end of beam 20 by a transverse brace 23. A hitch bracket 24, affixed to the forward end of beam 22 is connected by a truss rod 25 to a bar 26 secured to the rear end of the plow-carrying beam 20, and bracket 24 has a bearing opening therein to pivotally receive hitch pin 18 to accommodate lateral swinging movement of the plow frame relative to the hitch structure 12 and tractor 10 to follow the path of the tractor when the latter is turned.

It should now be clear that the front portion of the plow is supported entirely by the hitch structure 12 of the tractor and is vertically moved between operating and transport positions by operation of the power lift mechanism of the tractor to raise and lower the hitch structure.

The rear end of the plow is supported and is raised and lowered when the front end of the plow is raised and lowered, by the provision of a combination gauge and transport wheel assembly generally designated by the numeral 27. Assembly 27 comprises a wheel carrying arm in the form of a tubular member 28, best shown in FIG. 2, the forward end of which is pivoted on a transverse pivot pin or shaft 29 rotatably mounted in spaced bearings 30 provided in the lower portion of a bracket 31 affixed to the rear portion of beam 20 and projecting landwardly therefrom.

A generally vertically extending sleeve 32 is affixed, as by welding, to the rear end of arm 28 and rotatably receives a spindle 33 upon the lower end of which a wheel 34 is mounted through the intermediary of a laterally projecting stub shaft 35 secured to the lower end of the spindle, wheel 34 engaging the unplowed ground landwardly of the wall 36 of the furrow formed by the plow. The lower end of sleeve 32 engages a collar 37 secured to spindle 33, and the upper end of the spindle has secured thereto a laterally projecting steering arm 38.

Raising and lowering the rear end of the plow along with the raising and lowering of the front end is accomplished by the provision of an extensible and retractable member in the form of a one-way hydraulic cylinder 39, pivotally anchored at 40 to a lug 41 at the rear end of beam 20 and supplied with fluid under pressure at one end thereof through a hose line 42 from the pressure source on the tractor, under control of the tractor operator in a manner well known in the art. A piston rod 43 slidable in cylinder 39 is pivoted on a pin 44 carried by a lug 45 affixed to sleeve 32 and is extendable by the pressure of fluid from the retracted position of FIG. 2 with the plow in operation to swing arm 28 downwardly and raise the rear end of the plow to the elevated position indicated in FIGS. 1 and 3. Extension of the rod swings the wheel carrying arm downwardly until the plow bottoms are out of the furrow and in a transport position above the ground.

Release of pressure on the fluid fed to cylinder 39 allows the weight of the plow to retract the piston rod 43 in the cylinder and swing arm 28 upwardly about its pivot axis 29 and return the plow bottoms to operation. The operating depth of the plow bottoms 21 is maintained by wheel 34 engaging the unplowed ground, the downward movement of the rear end of the plow frame relative to wheel 34 being limited by stop means in the form of a bolt 46, shown in FIG. 2, adjustably receivable in a threaded opening provided in a plate 47 secured to and projecting rearwardly from beam 20. Bolt 46 has a head 48 engageable with a pad 49 affixed to arm 28 and a locknut 50 on the bolt is secured against the lower face of plate 47.

In order to facilitate turning the plow with the tractor, particularly when the plow is to be transported, steering linkage 51 for the rear wheel 34 is provided between the wheel and the tractor for transmitting the turning motion of the latter directly to the wheel. A steering arm 52 is affixed to and extends laterally from the upper end of hitch pin 18 and is connected to one end of a first link 53, adjustable in length and comprising a sleeve section 54 carrying a pin 55 adapted to be received in one of a plurality of suitable openings provided in a rod 56, slidably received in the sleeve and connected at its forward end to steering arm 52.

The rear end of link 53 has affixed thereto a clevis 57 pivotally connected by a pin 58 to the upper arm portion 59 of a steering motion transmitting member in the form of a lever 60 rockably mounted medially of its ends on a shaft 61 rotatable in a bearing 62 formed at the upper end of bracket 31 and generally parallel to the axis of pivot pin 29. The lower arm portion 63 of lever 60 is pivotally connected to a pin 64 substantially coaxial with pin 29, as indicated in FIG. 2, carried by a clevis 65 affixed to the forward end of another link 66, to the rear end of which is secured a clevis 67 pivotally connected by a pin 68 to the laterally outer end of rear wheel steering arm 38.

When the tractor operator wishes to raise the implement from its operating to its transport position he actuates the power lift mechanism of the tractor to raise the hitch structure 12 and the forward end of the plow. At the same time he actuates cylinder 39 to extend rod 43 and swing wheel arm 28 downwardly to raise the rear end of the plow. In this position, upon turning the tractor, for example to the left as viewed in FIG. 1, forward steering arm 52 being affixed to plates 17 remains stationary with the hitch structure 12 and the tractor, relatively angling the tractor with respect to the plow about the axis of hitch pin 18 and causing rearward thrust to be exerted by arm 52 through link 53 to rock lever 60 counterclockwise, as viewed in FIG. 2 and as indicated by the dotted line position of the upper portion 59 of the lever. The lower end of lever 60 swings forwardly with link 66 to swing rear steering arm 38 and wheel 34 clockwise, as viewed in FIGS. 1 and 3, to allow the plow to follow an arc generally concentric with the turning arc of the tractor.

Upon return of the plow to the operating position of FIG. 2, lever 60 is in the upright position shown and the connection of rear steering link 66 with pivot pin 64 at the lower end of lever 60 is substantially coaxial with the axis of pivot pin 29 for wheel arm 28.

In this position, since the fluid in cylinder 39 has been returned to the tractor reservoir, piston rod 43 is freely slidable therein, and when obstructions and the like are encountered by the plow bottoms 21 during operation, the upwardly directed forces tend to lift the frame and allow the wheel arm 28 to float vertically about pivot pin 29 with wheel 34 remaining in contact with the ground. Furthermore, due to the substantially coaxial relation of pivots 29 and 64 this relative vertical motion between the wheel carrying arm and the rear of the plow frame results in substantially no steering motion being transmitted through lever 60 to turn spindle 33, so that wheel 34 remains in its normal operating position parallel to the direction of travel of the plow.

What is claimed is:

1. A plow adapted for attachment to a tractor having hitch means thereon comprising, a frame carrying a plurality of diagonally arranged plow bottoms adapted to form furrows, means adapted to connect the plow frame to said hitch means for lateral swinging movement relative thereto, transverse pivot means on the rear of the frame, a rearwardly extending arm connected at its forward end to said pivot means for generally vertical swinging of the arm, a ground engaging wheel assembly mounted on the rear end of said arm, power transmission means between the frame and said arm for vertically adjusting the latter about the axis of said pivot means, and means responsive to said lateral swinging of the plow frame for steering said wheel assembly comprising, motion transmitting means mounted on the frame, a first link connecting said hitch means to said motion transmitting means, and another link connected at one end to said wheel assembly for steering the same and pivotally connected at its other end to said motion transmitting means on an axis which when the ground engaging wheel is parallel to the direction of travel is, substantially coaxial with the pivot of said arm on the frame.

2. The invention set forth in claim 1, wherein said motion transmitting means is a lever pivoted medially of its ends on the frame for rocking movement on an axis generally parallel to said pivot means and pivotally connected at one end to said first link and at its other end to said other link.

3. The invention set forth in claim 2, wherein said power transmission means is an extensible and retractable member operable in one direction to swing said wheel carrying arm downwardly about the axis of said pivot means to raise the rear end of the frame while maintaining the coaxial relation of said other link to said lever substantially unimpaired.

4. The invention set forth in claim 3, wherein said extensible and retractable member is a one-way hydraulic cylinder having a piston rod therein extensible to raise the rear of the plow frame to its transport position and collapsible by the weight of the plow upon return of the plow to its operating position.

5. The invention set forth in claim 4, wherein, in the operating position of the plow said piston rod is slidable in the cylinder to accommodate upward movement of the plow frame relative to the wheel to maintain engagement of the wheel with the ground when abnormal ground conditions are encountered exerting an upward force against the plow frame.

6. The invention set forth in claim 5, wherein a stop is provided on the rear of the frame engageable with said wheel carrying arm to limit downward movement of the plow frame relative to the wheel in the operating position of the plow.

7. The invention set forth in in claim 6, wherein said stop is adjustable to regulate and maintain the operating depth of the plow bottoms.

8. In a plow adapted for attachment to a tractor, a diagonally rearwardly extending frame adapted to be pivotally connected to the tractor for lateral swinging movement relative thereto, a plurality of plow bottoms mounted on the frame to form furrows, a gauge wheel assembly arranged to ride on unplowed ground landwardly of the furrow, a single wheel carrying arm pivotally connected at its forward end to the frame for vertical swinging movement about a generally horizontal axis transverse to the direction of travel of the plow, means mounting said wheel assembly on the rear end of said arm, steering linkage operatively connected between the tractor and said wheel for transmitting steering motion to said wheel in response to said lateral swinging movement of the plow frame relative to the tractor, and power transmission means connected between the frame and said wheel carrying arm for vertically swinging said arm to raise and lower the rear end of the frame, said steering linkage including a motion transmitting member mounted on the plow frame and a link connected at one end to said wheel assembly for steering the same and at its other end pivotally connected to said motion transmitting member on an axis substantially coaxial with the pivot axis which when the ground engaging wheel is parallel to the direction of travel is, of said arm.

9. The invention set forth in claim 8, wherein said motion transmitting member is a lever pivoted medially of its ends on the plow frame and to one end of which said link is pivotally connected, the other end of the lever being operatively connected to the tractor to transmit turning motion of the tractor through said lever to said wheel.

* * * * *